US011281945B1

(12) United States Patent
Tao et al.

(10) Patent No.: US 11,281,945 B1
(45) Date of Patent: Mar. 22, 2022

(54) MULTIMODAL DIMENSIONAL EMOTION RECOGNITION METHOD

(71) Applicant: INSTITUTE OF AUTOMATION, CHINESE ACADEMY OF SCIENCES, Beijing (CN)

(72) Inventors: Jianhua Tao, Beijing (CN); Licai Sun, Beijing (CN); Bin Liu, Beijing (CN); Zheng Lian, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/468,994

(22) Filed: Sep. 8, 2021

(30) Foreign Application Priority Data

Feb. 26, 2021 (CN) .......................... 202110214208.3

(51) Int. Cl.
*G06K 9/00* (2022.01)
*G06K 9/62* (2022.01)
(Continued)

(52) U.S. Cl.
CPC ........... *G06K 9/629* (2013.01); *G06F 40/279* (2020.01); *G06V 20/46* (2022.01); *G06V 40/174* (2022.01); *G10L 25/30* (2013.01); *G10L 25/63* (2013.01)

(58) Field of Classification Search
CPC ...................................................... G06K 9/00
See application file for complete search history.

(56) References Cited

U.S. PATENT DOCUMENTS

2008/0038707 A1  2/2008  Banhazl et al.
2019/0005021 A1* 1/2019  Miller .................. G10L 15/26
(Continued)

FOREIGN PATENT DOCUMENTS

CN    110033029 A    7/2019
CN    110083716 A    8/2019
(Continued)

OTHER PUBLICATIONS

First Office Action issued in counterpart Chinese Patent Application No. 202110214208.3, dated Apr. 6, 2021.

*Primary Examiner* — Olisa Anwah
(74) *Attorney, Agent, or Firm* — Westbridge IP LLC (57) ABSTRACT

A multimodal dimensional emotion recognition method includes: acquiring a frame-level audio feature, a frame-level video feature, and a frame-level text feature from an audio, a video, and a corresponding text of a sample to be tested; performing temporal contextual modeling on the frame-level audio feature, the frame-level video feature, and the frame-level text feature respectively by using a temporal convolutional network to obtain a contextual audio feature, a contextual video feature, and a contextual text feature; performing weighted fusion on these three features by using a gated attention mechanism to obtain a multimodal feature; splicing the multimodal feature and these three features together to obtain a spliced feature, and then performing further temporal contextual modeling on the spliced feature by using a temporal convolutional network to obtain a contextual spliced feature; and performing regression prediction on the contextual spliced feature to obtain a final dimensional emotion prediction result.

6 Claims, 5 Drawing Sheets

(51) Int. Cl.
  *G10L 25/63* (2013.01)
  *G06F 40/279* (2020.01)
  *G10L 25/30* (2013.01)
  *G06V 20/40* (2022.01)
  *G06V 40/16* (2022.01)

(56) References Cited

U.S. PATENT DOCUMENTS

2019/0311268 A1* 10/2019 Tilton ..................... G06F 40/30
2021/0151034 A1* 5/2021 Hasan .................. G06N 3/0481
2021/0390366 A1* 12/2021 Furman ................. G06N 3/008

FOREIGN PATENT DOCUMENTS

| CN | 110147548 A | 8/2019 |
| CN | 110188343 A | 8/2019 |
| CN | 110287389 A | 9/2019 |
| CN | 111275085 A | 6/2020 |

* cited by examiner

MULTIMODAL DIMENSIONAL EMOTION RECOGNITION METHOD

CROSS-REFERENCE TO RELATED APPLICATIONS

The present disclosure claims priority to Chinese Patent Application CN202110214208.3 entitled "Multimodal dimensional emotion recognition method" filed on Feb. 26, 2021, the entire content of which is incorporated herein by reference.

FIELD OF THE INVENTION

This application relates to the field of data processing, and in particular to a multimodal dimensional emotion recognition method.

BACKGROUND OF THE INVENTION

Current emotion recognition methods are mostly limited to a single, discrete emotion category, such as common six types of emotions proposed by psychologists: anger, disgust, fear, happiness, sadness, and surprise. Although such a discrete model is simple and intuitive, it can only represent a limited variety of single and definite emotion types. In fact, a close correlation may exist among many emotion categories, but it is difficult to measure and process this correlation after discretization. In addition, the generation, development and disappearance of emotion is a process of continuous change, and it is difficult for discrete models to describe those continuously changing emotions. Dimensional emotion models can describe subtle emotion fluctuations and can better overcome the above disadvantages of the discrete emotion models. Dimensional emotion recognition depends on effective fusion with multimodal information and efficient modeling on temporal contextual information. However, in some dimensional emotion recognition methods, features extracted in various modalities are spliced in a simple way, however, ignoring that the contributions made by different modal features at different times may vary. Meanwhile, in the face of long-term sequences, recurrent neural networks used in popular dimensional emotion recognition methods may achieve inefficient modeling due to the problem of vanishing gradients, resulting in poor emotion recognition.

Patent Application Publication CN110033029A discloses an emotion recognition method and device based on a multimodal emotion model, in which a basic dimensional prediction model is established, and a video dimensional prediction model, an audio dimensional prediction model, and a text dimensional prediction model are obtained from the basic dimensional prediction model, a video feature, an audio feature, and a phonetic text feature of a facial gesture are analyzed respectively to obtain a first emotion result, a second emotion result, and a third emotion result; and these three results are fused in combination with mapping relationships based on the basic dimensional prediction model to obtain an emotion category of a target object. It performs emotion recognition from multiple modalities and multiple perspectives, and provides several advantages such as comprehensive information, strong anti-interference, and high accuracy.

Patent Application Publication CN110188343A discloses a multimodal emotion recognition method based on a fusion attention network, in which high-dimensional features in three modalities of text, vision and audio are extracted and aligned at word-level and subjected to normalized processing, then they are input into a two-way gated recurrent unit network for training, status information output by the two-way gated recurrent unit network in three monomodal sub-networks is extracted to calculate correlations of the status information among multiple modalities, and then attention distribution of the multiple modalities at each time, i.e. a weighting parameter of the status information at each time, is calculated, weighted average is performed on the status information of the three modal sub-networks and their corresponding weighting parameters to obtain a fusion feature vector as an input into a fully connected network, and the text, the vision and the audio to be recognized are input into the trained two-way gated recurrent unit network in each modality to obtain a final emotional intensity output.

SUMMARY OF THE INVENTION

The present disclosure provides a multimodal dimensional emotion recognition method, including the following steps.

At step S1, an audio, a video, and a corresponding text of a sample to be tested are acquired, and features are extracted from the audio, the video, and the text respectively to obtain a frame-level audio feature, a frame-level video feature, and a frame-level text feature.

At step S2, temporal contextual modeling is performed on the frame-level audio feature, the frame-level video feature, and the frame-level text feature respectively by using a temporal convolutional network to obtain a contextual audio feature, a contextual video feature, and a contextual text feature.

At step S3, weighted fusion is performed on the contextual audio feature, the contextual video feature, and the contextual text feature by using a gated attention mechanism to obtain a multimodal feature.

At step S4, the multimodal feature, the contextual audio feature, the contextual video feature, and the contextual text feature are spliced to obtain a spliced feature, and then further temporal contextual modeling is performed on the spliced feature by using a temporal convolutional network to obtain a contextual spliced feature.

At step S5, regression prediction is performed on the contextual spliced feature to obtain a final dimensional emotion prediction result.

It should be noted that the temporal convolutional network used in step S2 and the temporal convolutional network used in step S4 may not be the same temporal convolutional network, and both may be different from each other in their weights.

In an exemplary embodiment of the present application, the process of extracting features from the audio, the video, and the text respectively may be specifically implemented in the following manners.

The audio is segmented to obtain frame-level short-term audio clips, and the short-term audio clips are input into a pre-trained audio feature extraction network respectively to obtain the frame-level audio feature.

Frame-level facial images are extracted from the video by using a facial detection tool, and the frame-level facial images are input into a pre-trained facial expression feature extraction network respectively to obtain the frame-level video feature.

The text is segmented into words by using a word segmentation tool, the text processed by word segmentation is input into a pre-trained text feature extraction network to obtain a word-level text feature.

By using a text alignment tool, alignment information of each word in the text of the sample to be tested is acquired.

According to the alignment information, the word-level text feature is converted into the frame-level text feature.

In an exemplary embodiment of the present disclosure, the process of performing temporal contextual modeling on the frame-level audio feature, the frame-level video feature, and the frame-level text feature respectively by using the temporal convolutional network may be specifically implemented in the following manners.

The frame-level audio feature is input into a first N-layer temporal convolutional network to obtain the contextual audio feature, where N is set to 1-3.

The frame-level video feature is input into a second N-layer temporal convolutional network to obtain the contextual video feature, where N is set to 1-3.

The frame-level text feature is input into a third N-layer temporal convolutional network to obtain the contextual text feature, where N is set to 1-3.

It should be noted that the first temporal convolutional network, the second temporal convolutional network, and the third temporal convolutional network may be different temporal convolutional networks, and their weights may differ from each other.

In an exemplary embodiment of the present disclosure, the process of performing weighted fusion on the contextual audio feature, the contextual video feature, and the contextual text feature by using the gated attention mechanism to obtain the multimodal feature may be specifically implemented in the following manners.

The contextual audio feature and the contextual text feature are spliced to obtain a contextual audio-text feature, and a weight coefficient of the contextual audio feature is calculated by using the attention mechanism and the contextual audio-text feature.

The contextual video feature and the contextual text feature are spliced to obtain a contextual video-text feature, and a weight coefficient of the contextual video feature is calculated by using the attention mechanism and the contextual video-text feature.

The contextual audio feature and the contextual video feature are weighted by using the weight coefficient of the contextual audio feature and the weight coefficient of the contextual video feature, and then a weighted result of the weighting is superimposed into the contextual text feature to obtain the multimodal feature fused with three-modal information.

In an exemplary embodiment of the present disclosure, the process of splicing the contextual audio feature and the contextual text feature to obtain the contextual audio-text feature may be specifically implemented in the following manners.

For each time t, a contextual audio feature at the time and a contextual text feature at the time are spliced to obtain a contextual audio-text feature at the time, i.e., $$h^{al} = [h^a, h^l],$$

where $h^a$ is the contextual audio feature at the time, and $h^l$ is the contextual text feature at the time.

The weight coefficient of the contextual audio feature is calculated by using the attention mechanism and the contextual audio-text feature according to:

$$\gamma^a = f_a(W_a h^{al} + b_a),$$

where $\gamma^a$ is the weight coefficient of the contextual audio feature;
$f_a$ is an activation function;
$W_a$ is a linear transformation matrix, which is a constant; and
$b_a$ is a bias coefficient, which is a constant.

In an exemplary embodiment of the present disclosure, the process of splicing the contextual video feature and the contextual text feature to obtain the contextual video-text feature may be specifically implemented in the following manners.

For each time t, a contextual video feature at the time and a contextual text feature at the time are spliced to obtain a contextual video-text feature at the time, i.e., $$h^{vl} = [h^v, h^l],$$

where $h^v$ is the video feature at the time, and $h^l$ is the text feature at the time.

The weight coefficient of the contextual video feature is calculated by using the attention mechanism and the contextual video-text feature according to:

$$\gamma^v = f_v(W_v h^{vl} + b_v),$$

where $\gamma^v$ is the weight coefficient of the contextual video feature;
$f_v$ is an activation function;
$W_v$ is a linear transformation matrix, which is a constant; and
$b_v$ is a bias coefficient, which is a constant.

In an exemplary embodiment of the present disclosure, the process of weighting the contextual audio feature and the contextual video feature by using the weight coefficient of the contextual audio feature and the weight coefficient of the contextual video feature may be specifically implemented in the following manners.

For each time t, the contextual audio feature $h^a$ at the time and the contextual video feature $h^v$ at the time are weighted to obtain $\Delta h^{av}$, $$\Delta h^{av} = \gamma^a h^a + \gamma^v h^v + b_{av},$$

where $b_{av}$ is a bias coefficient, which is a constant.

The multimodal feature fused with three-modal information is obtained according to:

$$h^{avl} = h^l + \beta \Delta h^{av},$$

where $h^{avl}$ is the multimodal feature at the time, and $\beta$ is an empirical coefficient.

In an exemplary embodiment of the present disclosure, the $\beta$ is set between 0 and 1.

In an exemplary embodiment of the present disclosure, the process of performing regression prediction on the contextual spliced feature to obtain the final dimensional emotion prediction result may be specifically implemented in the following manners.

The contextual spliced feature is input into the following fully connected network model for regression prediction:

$$y = \sigma(WS + b),$$

where $\sigma$ is a sigmoid activation function;
W is a linear transformation matrix, which is a constant;
b is a bias coefficient, which is a constant; and
y is a prediction result for the dimensional emotion.

The present disclosure further provides an electronic device including a memory, a processor, and a computer program stored on the memory and executable on the processor. The computer program, when executed by the processor, is configured to implement steps of the methods provided by the above solutions.

The above solution provided by the embodiments of the present disclosure has the following advantages.

The method provided by the embodiments of the disclosure adopts a gated attention mechanism to explicitly describe contributions made by features of the three modalities of audio, video, and text at different times, thereby realizing the function of adaptively integrating multimodal information. By stacking one-dimensional convolutional blocks which include dilated convolutions, the receptive field of each temporal convolutional network is greatly increased, modeling of the temporal contextual is effectively completed, and the problem of vanishing gradients existing in long term modeling using recurrent neural network is appropriately avoided, therefore achieving effective recognition of subtle emotional fluctuations. The method can address the problem of consistency in weights of various modalities during multimodal fusion, and can improve the accuracy of emotion recognition under multimodal fusion.

BRIEF DESCRIPTION OF THE DRAWINGS

The accompanying drawings, which are incorporated in and constitute a part of this specification, illustrate exemplary embodiments of the present disclosure, and together with the description serve to explain the principles of the disclosure.

In order to more clearly explain the embodiments of the present disclosure or the technical solutions in the existing technologies, drawings that need to be used in the description of the embodiments or the existing technologies will be briefly introduced below. Obviously, for those of ordinary skill in the art, other drawings can be obtained based on these drawings without any creative effort.

DETAILED DESCRIPTION OF THE EMBODIMENTS

In order to make the objectives, technical solutions and advantages of the present disclosure clearer, the technical solutions in the embodiments of the present disclosure will be further described in details in conjunction with the accompanying figures showing exemplary embodiments of the disclosure. Obviously, the described embodiments are only part of the embodiments of the present invention, rather than all of the embodiments thereof. All other embodiments obtained based on embodiments in the present disclosure by those of ordinary skill in the art without any creative effort fall within the scope of the present disclosure.

Embodiment One

Figure 1:
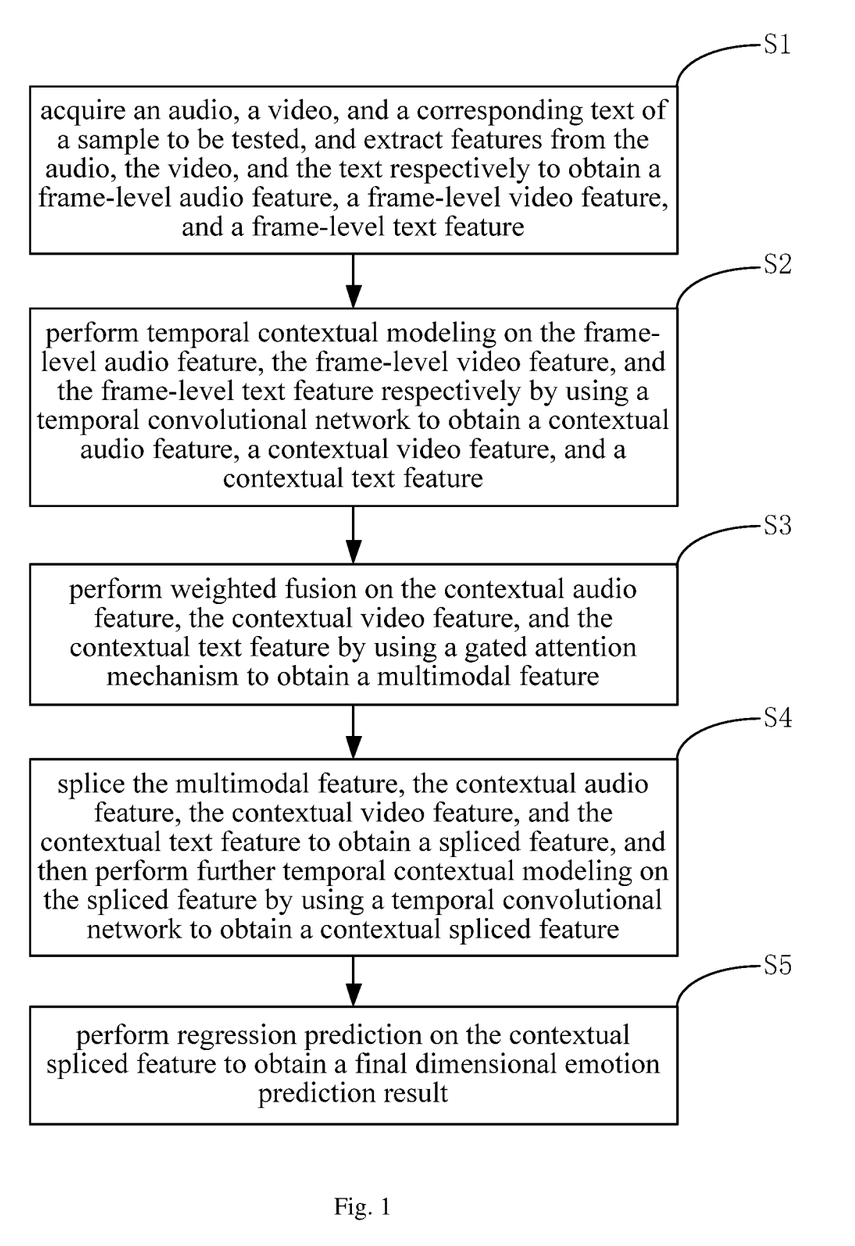
FIG. 1 is a flowchart illustrating a multimodal dimensional emotion recognition method provided by an embodiment of the present disclosure.

FIG. 1 shows a multimodal dimensional emotion recognition method provided by an embodiment of the present disclosure, which includes the following steps.

At step S1, an audio, a video, and a corresponding text of a sample to be tested are acquired, and features are extracted from the audio, the video, and the text respectively to obtain a frame-level audio feature, a frame-level video feature, and a frame-level text feature.

At step S2, temporal contextual modeling is performed on the frame-level audio feature, the frame-level video feature, and the frame-level text feature respectively by using a temporal convolutional network to obtain a contextual audio feature, a contextual video feature, and a contextual text feature.

At step S3, weighted fusion is performed on the contextual audio feature, the contextual video feature, and the contextual text feature by using a gated attention mechanism to obtain a multimodal feature.

At step S4, the multimodal feature, the contextual audio feature, the contextual video feature, and the contextual text feature are spliced to obtain a spliced feature, and then further temporal contextual modeling is performed on the spliced feature by using a temporal convolutional network to obtain a contextual spliced feature.

At step S5, regression prediction is performed on the contextual spliced feature to obtain a final dimensional emotion prediction result.

According to the above solution, the process of extracting features from the audio, the video and the text respectively may be specifically implemented in the following manners.

The audio is segmented to obtain frame-level short-term audio clips, and the short-term audio clips are input into a pre-trained audio feature extraction network respectively to obtain the frame-level audio feature.

Frame-level facial images are extracted from the video by using a facial detection tool, and the frame-level facial images are input into a pre-trained facial expression feature extraction network respectively to obtain the frame-level video feature.

The text is segmented into words by using a word segmentation tool, the text processed by word segmentation is input into a pre-trained text feature extraction network to obtain a word-level text feature, alignment information of each word in the text of the sample to be tested is acquired by using a text alignment tool, and the word-level text feature is converted into the frame-level text feature according to the alignment information.

According to the above solution, the process of performing temporal contextual modeling on the frame-level audio feature, the frame-level video feature, and the frame-level text feature respectively by using the temporal convolutional network may be specifically implemented in the following manners.

The frame-level audio feature is input into a first N-layer temporal convolutional network to obtain the contextual audio feature, where N is set to 1-3.

The frame-level video feature is input into a second N-layer temporal convolutional network to obtain the contextual video feature, where N is set to 1-3.

The frame-level text feature is input into a third N-layer temporal convolutional network to obtain the contextual text feature, where N is set to 1-3.

It should be noted that the first temporal convolutional network, the second temporal convolutional network, and the third temporal convolutional network may be different temporal convolutional networks, and their weights may differ from each other. Alternatively, at least two of the first temporal convolutional network, the second temporal convolutional network, and the third temporal convolutional network may also be the same temporal convolutional network, which is not limited herein.

According to the above solution, the process of performing weighted fusion on the contextual audio feature, the contextual video feature, and the contextual text feature by using the gated attention mechanism to obtain the multimodal feature may be specifically implemented in the following manners.

The contextual audio feature and the contextual text feature are spliced to obtain a contextual audio-text feature, and a weight coefficient of the contextual audio feature is calculated by using the attention mechanism and the contextual audio-text feature.

The contextual video feature and the contextual text feature are spliced to obtain a contextual video-text feature, and a weight coefficient of the contextual video feature is calculated by using the attention mechanism and the contextual video-text feature.

The contextual audio feature and the contextual video feature are weighted by using the weight coefficient of the contextual audio feature and the weight coefficient of the contextual video feature, and then a weighted result of the weighting is superimposed into the contextual text feature to obtain the multimodal feature fused with three-modal information.

According to the above solution, the process of splicing the contextual audio feature and the contextual text feature to obtain the contextual audio-text feature may be specifically implemented in the following manners.

For each time t, a contextual audio feature at the time and a contextual text feature at the time are spliced to obtain a contextual audio-text feature at the time, i.e., $$h^{al}=[h^a,h^l],$$

where $h^a$ is the contextual audio feature at the time, and $h^l$ is the contextual text feature at the time.

The weight coefficient of the contextual audio feature is calculated by using the attention mechanism and the contextual audio-text feature according to:

$$\gamma^a=f_a(W_a h^{al}+b_a),$$

where $\gamma^a$ is the weight coefficient of the contextual audio feature;
$f_a$ is an activation function;
$W_a$ is a linear transformation matrix, which is a constant; and
$b_a$ is a bias coefficient, which is a constant.

According to the above solution, the process of splicing the contextual video feature and the contextual text feature to obtain the contextual video-text feature may be specifically implemented in the following manners.

For each time t, a contextual video feature at the time and a contextual text feature at the time are spliced to obtain a contextual video-text feature at the time, i.e., $$h^{vl}=[h^v,h^l],$$

where $h^v$ is the contextual video feature at the time, and $h^l$ is the contextual text feature at the time.

The weight coefficient of the contextual video feature is calculated by using the attention mechanism and the contextual video-text feature according to:

$$\gamma^v=f_v(W_v h^{vl}+b_v),$$

where $\gamma^v$ is the weight coefficient of the contextual video feature;
$f_v$ is an activation function;
$W_v$ is a linear transformation matrix, which is a constant; and
$b_v$ is a bias coefficient, which is a constant.

According to the above solution, the process of weighting the contextual audio feature and the contextual video feature by using the weight coefficient of the contextual audio feature and the weight coefficient of the contextual video feature may be specifically implemented in the following manners.

For each time t, the contextual audio feature $h^a$ at the time and the contextual video feature $h^v$ at the time are weighted to obtain $\Delta h^{av}$, $$\Delta h^{av}=\gamma^a h^a+\gamma^v h^v+b_{av},$$

where $b_{av}$ is a bias coefficient, which is a constant.

The multimodal feature fused with three-modal information is obtained according to:

$$h^{avl}=h^l+\beta \Delta h^{av},$$

where $h^{avl}$ is the multimodal feature at the time, and $\beta$ is an empirical coefficient. The $\beta$ is set between 0 and 1.

According to the above solution, the process of performing regression prediction on the contextual spliced feature to obtain the final dimensional emotion prediction result may be specifically implemented in the following manners.

The contextual spliced feature is input into the following fully connected network model for regression prediction:

$$y=\sigma(WS+b),$$

where $\sigma$ is a sigmoid activation function;
W is a linear transformation matrix, which is a constant;
b is a bias coefficient, which is a constant; and
y is a prediction result for the dimensional emotion.

Based on the same inventive conception, an embodiment of the present disclosure further provides an electronic device including a memory, a processor, and a computer program stored on the memory and executable on the processor. The computer program, when executed by the processor, is configured to implement steps of the multimodal dimensional emotion recognition method provided by any one of the above solutions.

Embodiment Two

As shown in FIG. 1, a multimodal dimensional emotion recognition method provided by an embodiment of the present disclosure includes the following steps.

At step S1, an audio, a video, and a corresponding text of a sample to be tested are acquired, and features are extracted from the audio, the video, and the text respectively to obtain a frame-level audio feature, a frame-level video feature, and a frame-level text feature.

In some embodiments, the audio to be tested and the video to be tested are video and audio in a same segment, and the text to be tested corresponds to the audio to be tested and the video to be tested, and the audio, the video, and the text belong respectively to three modalities of the segment.

In some embodiments, data of these three modalities in this embodiment needs to be analyzed to recognize a dimensional emotional status of a character in the segment at each time.

In some embodiments, a segment may be obtained in which a character is speaking. Continuous pictures during the speech of this character may be the video to be tested. An audio that appears in the segment of video may be the audio to be tested. A text corresponding to the video and the audio in the segment may be the text to be tested. For example, in the segment, a character spoke a sentence, pictures during the speech of this character may be the video to be tested, speech utterances of this character may be the audio to be tested, and the textual content in the speech of this character may be the text to be tested.

Features from the audio to be tested, the video to be tested, and the text to be tested are extracted to obtain a frame-level audio feature $X^a$, a frame-level video feature $X^v$ and a word-level text feature $X^l$.

In some embodiments, the feature extraction from the audio to be tested, the video to be tested, and the text to be tested is performed by inputting the audio to be tested, the video to be tested, and the text to be tested into a pre-trained neural network for feature extraction from hidden layers. The frame-level audio feature refers to the feature of each frame of the audio after short-term segmentation, the frame-level video feature refers to the feature of each frame of the video, and the frame-level text feature refers to the feature of words in the text corresponding to each frame of the audio and/or each frame of the video.

In some embodiments, the process of performing feature extraction from the audio to be tested, the video to be tested, and the text to be tested to obtain the frame-level audio feature $X^a$, the frame-level video feature $X^v$ and the word-level text feature $X^l$ may include the following specific steps.

Figure 2:
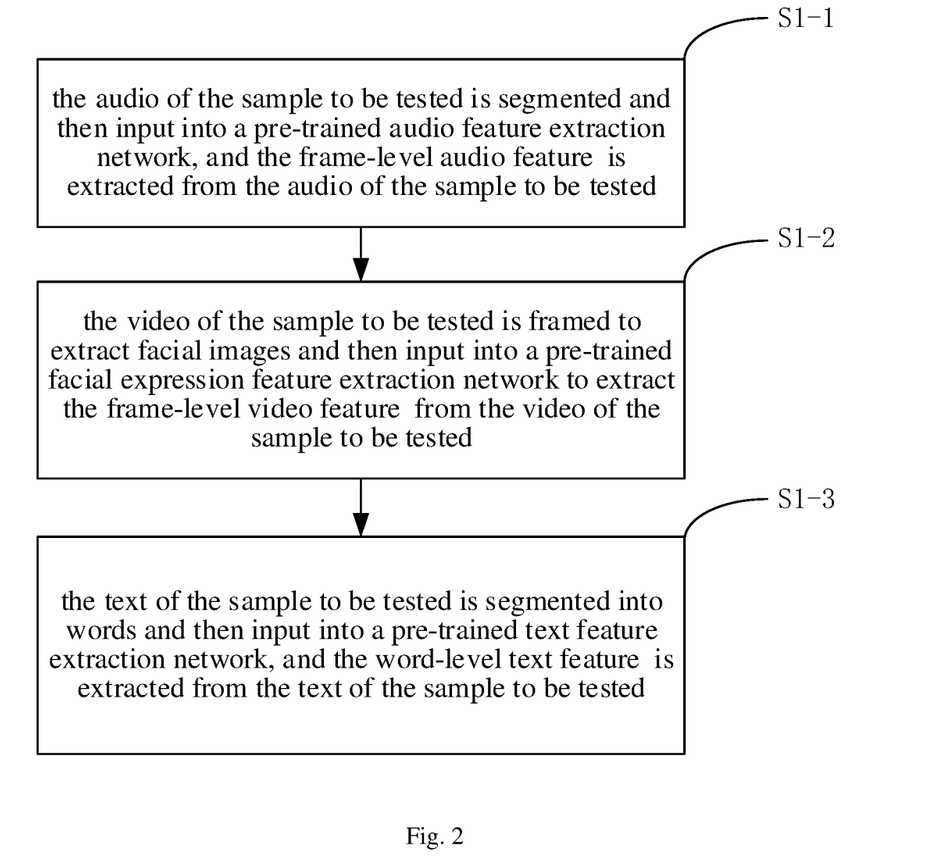
FIG. 2 is a flowchart illustrating a process of performing feature extraction from the audio to be tested, the video to be tested, and the text to be tested to obtain the frame-level audio feature $X^a$, the frame-level video feature $X^v$ and the word-level text feature $X^l$ provided by an embodiment of the present disclosure.

As shown in FIG. 2, a step S1-1, the audio of the sample to be tested is segmented and then input into a pre-trained audio feature extraction network, and the frame-level audio feature $X^a$ is extracted from the audio of the sample to be tested.

In some embodiments, the process of segmenting the audio of the sample to be tested and then inputting it into the pre-trained audio feature extraction network, and extracting the frame-level audio feature $X^a$ from the audio of the sample to be tested may include the following specific steps.

At a first substep of step S1-1, the audio of the sample to be tested is segmented into multiple frames of short-term audio clips with a frame length of is and a frame shift of 0.1 s.

At a second substep of step S1-1, the above short-term audio clips are input into the pre-trained audio feature extraction network respectively, and the output from a middle layer thereof is extracted to obtain frame-level audio feature $X^a$.

In some embodiments, the audio feature extraction network may use a common feature extraction network, such as VGGish, which is not limited by the embodiment.

As shown in FIG. 2, a step S1-2, the video of the sample to be tested is framed to extract facial images and then input into a pre-trained facial expression feature extraction network to extract the frame-level video feature $X^v$ from the video of the sample to be tested.

In some embodiments, the process of segmenting the audio of the sample to be tested and then inputting it into the pre-trained audio feature extraction network, and extracting the frame-level audio feature $X^v$ from the audio of the sample to be tested may include the following specific steps.

At a first substep of step S1-2, a facial detection tool is used to extract a facial image of each frame from the video of the sample to be tested.

At a first substep of step S1-2, frame-level facial images are input into a pre-trained facial expression feature extraction network respectively to obtain the frame-level video feature $X^v$.

In some embodiments, the facial expression feature extraction network may adopt a common feature extraction network, such as ResNet pre-trained on a facial expression database, which is not limited by the embodiment.

As shown in FIG. 2, at step S1-3, the text of the sample to be tested is segmented into words and then input into a pre-trained text feature extraction network, and the word-level text feature $X^l$ is extracted from the text of the sample to be tested.

In some embodiments, the process of segmenting the text of the sample to be tested into words and then inputting it into the pre-trained text feature extraction network, and extracting the word-level text feature $X^l$ from the text of the sample to be tested may include the following specific steps.

At a first substep of step S1-3, the text of the voice to be tested is segmented into words by using a word segmentation tool.

In some embodiments, the word segmentation tool adopts a common word segmentation tool, which is not limited by the embodiment.

At a second substep of step S1-3, the text processed by word segmentation is input into the pre-trained text feature extraction network to obtain the word-level text feature $X^l$.

In some embodiments, the text feature extraction network may adopt a common feature extraction network, such as BERT, which is not limited by the embodiment.

At step S2, temporal contextual modeling is performed on the frame-level audio feature, the frame-level video feature, and the frame-level text feature respectively by using a temporal convolutional network to obtain a contextual audio feature $H^a$, a contextual video feature $H^v$, and a contextual text feature $H^l$.

In some embodiments, the process of performing temporal contextual modeling on the frame-level audio feature, the frame-level video feature, and the frame-level text feature respectively by using the temporal convolutional network to obtain the contextual audio feature $H^a$, the contextual video feature $H^v$, and the contextual text feature $H^l$ may include the following specific steps.

Figure 3:
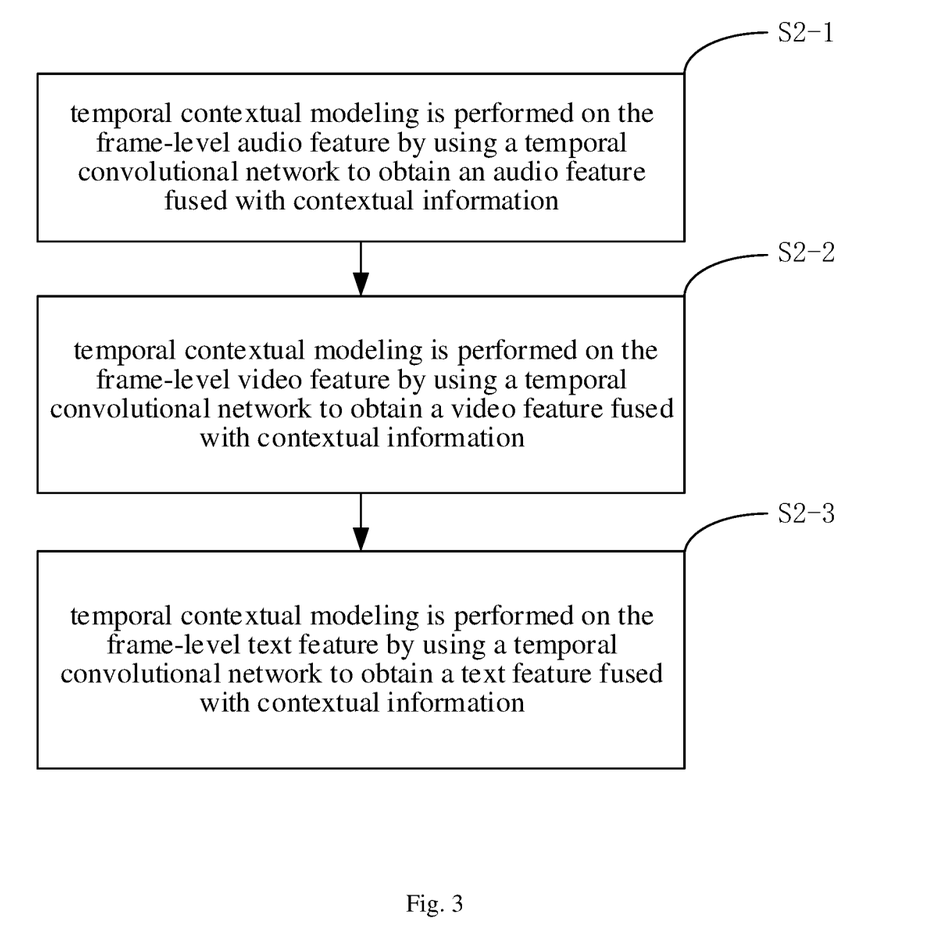
FIG. 3 is a flowchart illustrating the process of performing temporal contextual modeling on the frame-level audio feature, the frame-level video feature, and the frame-level text feature respectively by using the temporal convolutional network to obtain the contextual audio feature $H^a$, the contextual video feature $H^v$, and the contextual text feature $H^l$ provided by an embodiment of the present disclosure.

As shown in FIG. 3, at step S2-1, temporal contextual modeling is performed on the frame-level audio feature by using a temporal convolutional network to obtain an audio feature fused with contextual information, i.e., the contextual audio feature $H^a$.

In some embodiments, the frame-level audio depth feature $X^a$ is directly input into an N-layer temporal convolutional network, where N may generally be set to 1-3, which is not limited here. Specifically, $$H^a = TCN(X^a),$$

TCN(·) is the temporal convolutional network.

As shown in FIG. 3, at step S2-2, temporal contextual modeling is performed on the frame-level video feature by using a temporal convolutional network to obtain a video feature fused with contextual information, i.e., the contextual video feature $H^v$.

In some embodiments, the frame-level video feature $X^v$ is directly input into an N-layer temporal convolutional network, where N may generally be set to 1-3, which is not limited here. Specifically, $$H^v = TCN(X^v).$$

At step S2-3, temporal contextual modeling is performed on the frame-level text feature by using a temporal convolutional network to obtain a text feature fused with contextual information, i.e., the contextual text feature $H^l$.

In some embodiments, the frame-level text depth feature $X^v$ is directly input into an N-layer temporal convolutional network, where N may generally be set to 1-3, which is not limited here. Specifically, $$H^l = TCN(X^l).$$

At step S3, weighted fusion is performed on the contextual audio feature, the contextual video feature, and the contextual text feature by using a gated attention mechanism to obtain a fused multimodal feature $H^{avl}$.

In some embodiments, the gated attention mechanism can calculate contributions of different modal features at each time, so that the model can focus on modal features with high weights when recognizing dimensional emotional statuses, which may be conducive to improving the accuracy of emotion recognition.

In some embodiments, the process of performing weighted fusion on the contextual audio feature, the contextual video feature, and the contextual text feature by using a gated attention mechanism to obtain a fused multimodal feature $H^{avl}$ may include the following specific steps.

Figure 4:
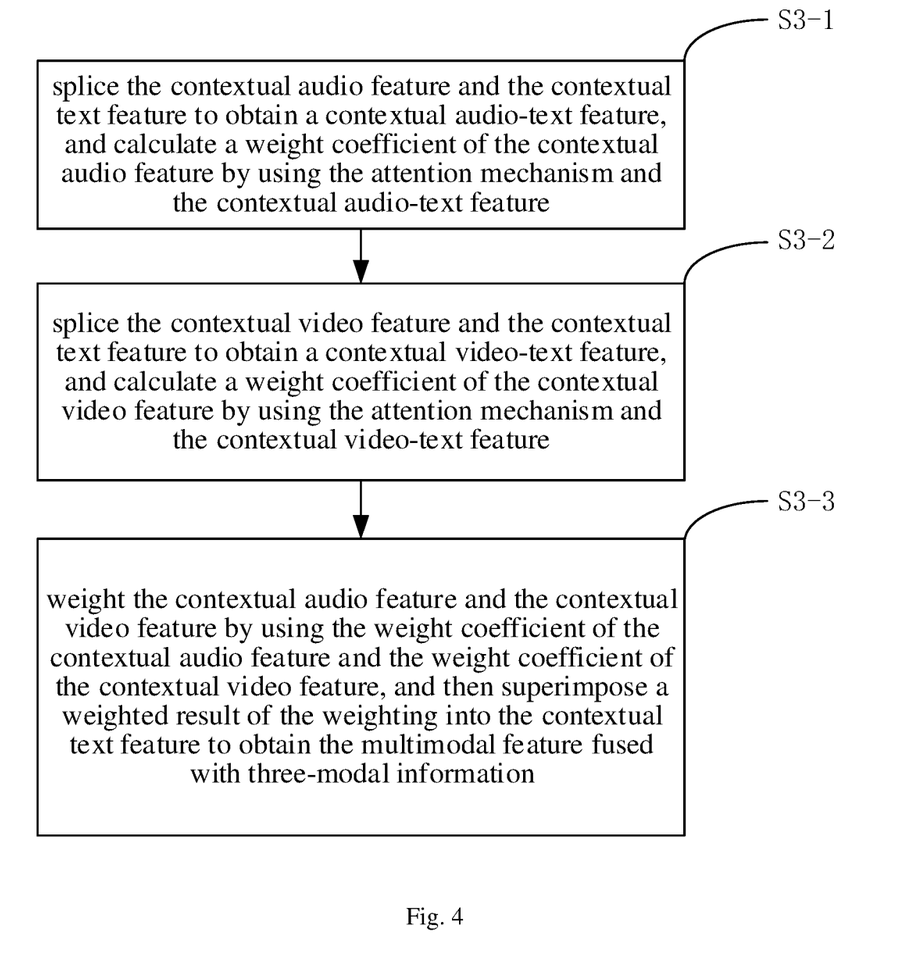
FIG. 4 is a flowchart illustrating a process of performing weighted fusion on the contextual audio feature, the contextual video feature, and the contextual text feature by using a gated attention mechanism to obtain a fused multimodal feature $H^{avl}$ provided by an embodiment of the present disclosure.

As shown in FIG. 4, at step S3-1, the contextual audio feature and the contextual text feature are spliced to obtain a contextual audio-text feature, and a weight coefficient of the contextual audio feature is calculated by using the attention mechanism and the contextual audio-text feature.

At a first substep of step S3-1, in the process of splicing the contextual audio feature and the contextual text feature to obtain the contextual audio-text feature, the following steps may be implemented.

For each time t, a contextual audio feature at the time and a contextual text feature at the time are spliced to obtain a contextual audio-text feature at the time, i.e., $$h^{al} = [h^a, h^l],$$

where $h^a$ is the audio feature at the time, and $h^l$ is the text feature at the time.

At a second substep of step S3-1, the weight coefficient of the contextual audio feature is calculated by using the attention mechanism and the contextual audio-text feature according to:

$$\gamma^a = f_a(W_a h^{al} + b_a),$$

where
$\gamma^a$ is the weight coefficient of the contextual audio feature;
$f_a$ is an activation function;
$W_a$ is a linear transformation matrix, which is a constant; and
$b_a$ is a bias coefficient, which is a constant.

As shown in FIG. 4, at step S3-2, the contextual video feature and the contextual text feature are spliced to obtain a contextual video-text feature, and a weight coefficient of the contextual video feature is calculated by using the attention mechanism and the contextual video-text feature.

At a first substep of step S3-2, in the process of splicing the contextual video feature and the contextual text feature to obtain the contextual video-text feature, the following steps may be implemented.

For each time t, a contextual video feature at the time and a contextual text feature at the time are spliced to obtain a contextual video-text feature at the time, i.e., $$h^{vl} = [h^v, h^l],$$

where $h^v$ is the video feature at the time, and $h^l$ is the text feature at the time.

At a second substep of step S3-2, the weight coefficient of the contextual video feature is calculated by using the attention mechanism and the contextual video-text feature according to:

$$\gamma^v = f_v(W_v h^{vl} + b_v),$$

where
$\gamma^v$ is the weight coefficient of the contextual video feature;
$f_v$ is an activation function;
$W_v$ is a linear transformation matrix, which is a constant; and
$b_v$ is a bias coefficient, which is a constant.

As shown in FIG. 4, at step S3-3, the contextual audio feature and the contextual video feature are weighted by using the weight coefficient of the contextual audio feature and the weight coefficient of the contextual video feature, and then a weighted result of the weighting is superimposed with the contextual text feature to obtain the multimodal feature fused with three-modal information.

At a first substep of step S3-3, for each time 1, the contextual audio feature $h^a$ at the time and the contextual video feature $h^v$ at the time are weighted to obtain $\Delta h^{av}$, $$\Delta h^{av} = \gamma^a h^a + \gamma^v h^v + b_{av},$$

where $b_{av}$ is a bias coefficient, which is a constant.

At a second substep of step S3-3, the multimodal feature fused with three-modal information is obtained according to:

$$h^{avl} = h^l + \beta \Delta h^{av},$$

where $h^{avl}$ is the multimodal feature at the time, and $\beta$ is an empirical coefficient, which is set between 0 and 1 and the function of which is to reduce the influence of the audio and video features and enhance contribution of the text feature to the multimodal feature.

At step S4, the multimodal feature, the contextual audio feature, the contextual video feature, and the contextual text feature are spliced to obtain a spliced feature, and then further temporal contextual modeling is performed on the spliced feature by using a temporal convolutional network to obtain a contextual spliced feature.

In some embodiments, the process of splicing the multimodal feature, the contextual audio feature, the contextual video feature, and the contextual text feature to obtain the spliced feature, and then performing further temporal contextual modeling on the spliced feature by using the temporal convolutional network to obtain the contextual spliced feature may include the following specific steps.

Figure 5:
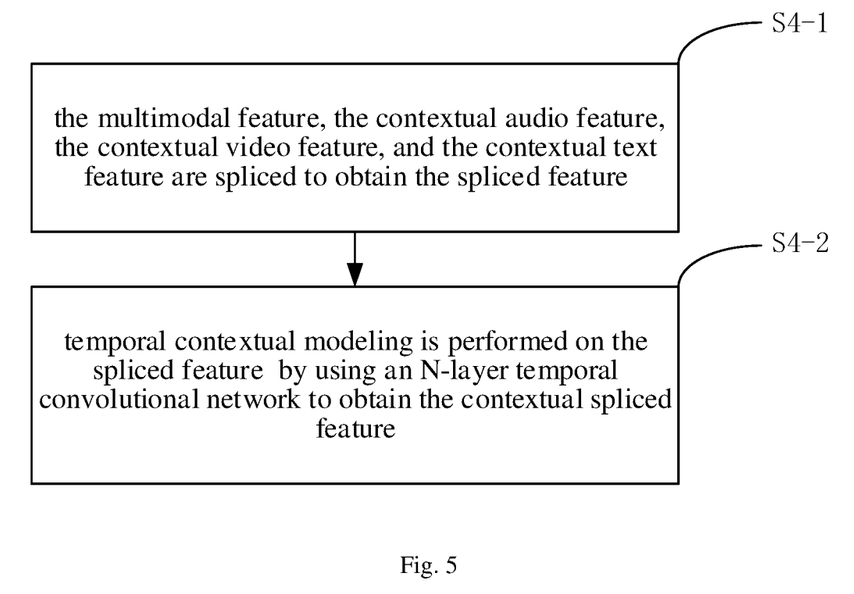
FIG. 5 is a flowchart illustrating a process of splicing the multimodal feature, the contextual audio feature, the contextual video feature, and the contextual text feature to obtain the spliced feature, and then performing temporal contextual modeling on the spliced feature by using the temporal convolutional network again to obtain the contextual spliced feature provided by an embodiment of the present disclosure.

As shown in FIG. 5, at step S4-1, the multimodal feature, the contextual audio feature, the contextual video feature, and the contextual text feature are spliced to obtain the spliced feature $H = [H^{avl}, X^a, X^v, X^l]$.

As shown in FIG. 5, at step S4-2, temporal contextual modeling is performed on the spliced feature H by using an N-layer temporal convolutional network to obtain the contextual spliced feature S. In this embodiment, N may be set to 3-5. Specifically, $$S=TCN(H),$$

where TCN is the temporal convolutional network.

At step S5, regression prediction is performed on the contextual spliced feature to obtain a final dimensional emotion prediction result.

In some embodiments, the process of performing regression prediction on the contextual spliced feature to obtain the final dimensional emotion prediction result may include the following steps.

Figure 6:
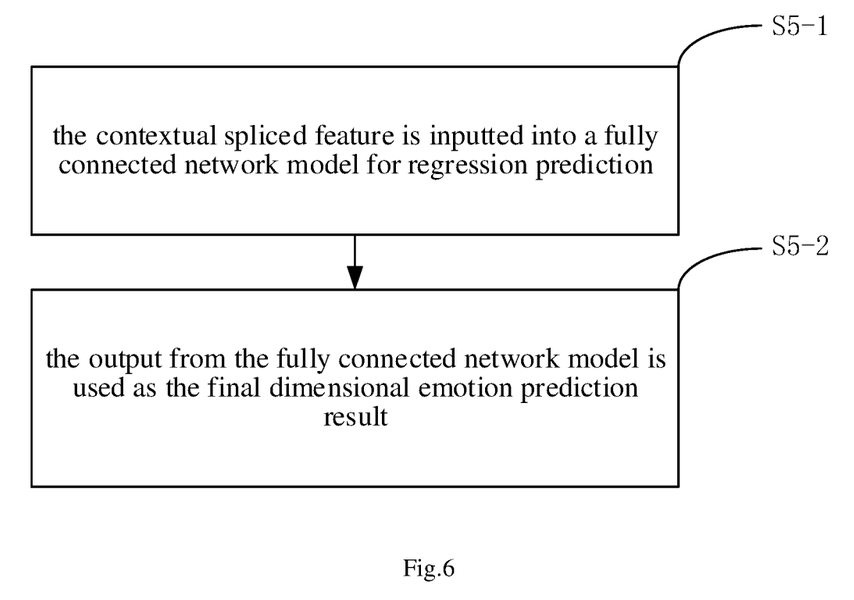
FIG. 6 is a flowchart illustrating a process of performing regression prediction on the contextual spliced feature to obtain the final dimensional emotion prediction result provided by an embodiment of the present disclosure.

As shown in FIG. 6, at step S5-1, the contextual spliced feature is inputted into a fully connected network model for regression prediction. The fully connected network model is as follows:

$$y=\sigma(WS+b),$$

where σ is a sigmoid activation function, and W and b are a linear transformation matrix and a bias coefficient, respectively.

As shown in FIG. 6, at step S5-2, the output from the fully connected network model is used as the final dimensional emotion prediction result.

Based on the same inventive conception, a further embodiment of the present disclosure provides an electronic device including a memory, a processor, and a computer program stored on the memory and executable on the processor. The computer program, when executed by the processor, is configured to implement steps of the multimodal dimensional emotion recognition method provided by any one of the above embodiments of the present disclosure.

Because the device embodiments basically correspond to the process embodiments, the description of the device embodiments is simple, and reference can be made to the description of the process embodiments for relevant parts.

The embodiments in this description are described in a progressive manner. Each embodiment focuses on the differences from other embodiments, while the same or similar parts between the embodiments refer to each other.

It should be understood by those skilled in the art that the embodiments of the present disclosure may be provided as a method, a device, or a computer program product. Thus, the embodiments of the present disclosure may take the form of a hardware embodiment, a software embodiment, or an embodiment combining software and hardware aspects. Moreover, the embodiments of the present disclosure may take the form of a computer program product that can be implemented on one or more computer usable storage mediums (which include, but are not limited to, a disk memory, a CD-ROM, an optical memory, etc.) that include computer usable program codes.

The embodiments of the present disclosure are described according to the flowchart and/or the block diagram of the method, apparatus (system), and the computer program product in embodiments of the present disclosure. It should be understood that each process and/or block in the flowchart and/or the block diagram and a combination of the process and/or block in the flowchart and/or the block diagram may be implemented by a computer program instruction. Such computer program instructions may be provided to a general-purpose computer, a special-purpose computer, an embedded processor, or a processor of other programmable data processing terminal device to produce a machine, so that instructions executed by the computer or the processor of other programmable data processing terminal apparatus create means for implementing the functions designated by one or more processes in a flow chart and/or one or more blocks in a block diagram.

These computer program instructions may also be stored in a computer-readable memory that can direct the computer or other programmable data processing terminal apparatus to work in a specific manner, so that instructions stored in the computer-readable memory produce an article of manufacture including an instruction device that implements functions designated in one or more processes in the flowchart and/or one or more blocks in the block diagram.

These computer program instructions may also be loaded onto the computer or other programmable data processing terminal apparatus, so that a series of operation steps are executed on the computer or other programmable terminal apparatus to produce computer-implemented processing, so that instructions executed on the computer or other programmable terminal apparatus provide steps for implementing functions designated in one or more processes in the flowchart and/or one or more blocks in the block diagram.

It should be noted that relational terms such as "first" and "second" herein are used solely to distinguish one from another entity or operation, without necessarily requiring or implying any such actual relationship or order between such entities or operations. The terms "comprises", "includes", or any other variation thereof, are intended to cover a non-exclusive inclusion, such that a process, a method, an article, or an apparatus that includes a series of elements not only includes those elements but also may include other elements not expressly listed or inherent to such process, method, article, or apparatus. An element preceded by "includes a . . . " does not, without more constraints, preclude the existence of additional identical elements in the process, method, article, or apparatus that includes the element.

In the above description, only specific embodiments of the present disclosure have been provided, so that those skilled in the art can understand or implement the present disclosure. Various modifications to those embodiments will be obvious to those skilled in the art, and general principles defined herein can be implemented in other embodiments without departing from the spirit or scope of the present disclosure. Therefore, the present disclosure will not be limited to the embodiments described herein, but shall accord with the widest scope consistent with the principles and novel characteristics described and claimed herein.

What is claimed is:

1. A multimodal dimensional emotion recognition method, comprising:
- S1, acquiring an audio, a video, and a corresponding text of a sample to be tested, and extracting features from the audio, the video, and the text respectively to obtain a frame-level audio feature, a frame-level video feature, and a frame-level text feature;
- S2, performing temporal contextual modeling on the frame-level audio feature, the frame-level video feature, and the frame-level text feature respectively by using a temporal convolutional network to obtain a contextual audio feature, a contextual video feature, and a contextual text feature;
- S3, performing weighted fusion on the contextual audio feature, the contextual video feature, and the contextual text feature by using a gated attention mechanism to obtain a multimodal feature;
- S4, splicing the multimodal feature, the contextual audio feature, the contextual video feature, and the contextual text feature to obtain a spliced feature, and then performing further temporal contextual modeling on the spliced feature by using a temporal convolutional network to obtain a contextual spliced feature; and S5, performing regression prediction on the contextual spliced feature to obtain a final dimensional emotion prediction result, wherein the step of performing weighted fusion on the contextual audio feature, the contextual video feature, and the contextual text feature by using the gated attention mechanism to obtain the multimodal feature comprises:

splicing the contextual audio feature and the contextual text feature to obtain a contextual audio-text feature, and calculating a weight coefficient of the contextual audio feature by using the attention mechanism and the contextual audio-text feature;

splicing the contextual video feature and the contextual text feature to obtain a contextual video-text feature, and calculating a weight coefficient of the contextual video feature by using the attention mechanism and the contextual video-text feature; and weighting the contextual audio feature and the contextual video feature by using the weight coefficient of the contextual audio feature and the weight coefficient of the contextual video feature, and then superimposing a weighted result of the weighting into the contextual text feature to obtain the multimodal feature fused with three-modal information;

wherein the step of splicing the contextual audio feature and the contextual text feature to obtain the contextual audio-text feature comprises:

for each time t, splicing a contextual audio feature at the time and a contextual text feature at the time to obtain a contextual audio-text feature at the time, i.e., $$h^{at}=[h^a,h^t],$$

where $h^a$ is the contextual audio feature at the time, and $h^t$ is the contextual text feature at the time;

wherein the weight coefficient of the contextual audio feature is calculated by using the attention mechanism and the contextual audio-text feature according to:

$$\gamma^a=f_a(W_a h^{at}+b_a),$$

where $\gamma^a$ is the weight coefficient of the contextual audio feature;

$f_a$ is an activation function;

$W_a$ is a linear transformation matrix, which is a constant; and $b_a$ is a bias coefficient, which is a constant;

wherein the step of splicing the contextual video feature and the contextual text feature to obtain the contextual video-text feature comprises:

for each time t, splicing a contextual video feature at the time and a contextual text feature at the time to obtain a contextual video-text feature at the time, i.e., $$h^{vt}=[h^v,h^t],$$

where $h^v$ is the contextual video feature at the time, and $h^t$ is the contextual text feature at the time;

wherein the weight coefficient of the contextual video feature is calculated by using the attention mechanism and the contextual video-text feature according to:

$$\gamma^v=f_v(W_v h^{vt}+b_v),$$

where $\gamma^v$ is the weight coefficient of the contextual video feature;

$f_v$ is an activation function;

$W_v$ is a linear transformation matrix, which is a constant; and $b_v$ is a bias coefficient, which is a constant;

wherein the step of weighting the contextual audio feature and the contextual video feature by using the weight coefficient of the contextual audio feature and the weight coefficient of the contextual video feature comprises:

for each time t, weighting the contextual audio feature $h^a$ at the time and the contextual video feature $h^v$ at the time to obtain $\Delta h^{av}$, $$\Delta h^{av}=\gamma^a h^a+\gamma^v h^v+b_{av},$$

where $b_{av}$ is a bias coefficient, which is a constant;

wherein the multimodal feature fused with three-modal information is obtained according to:

$$h^{avt}=h^t+\beta \Delta h^{av},$$

where $h^{avt}$ is the multimodal feature at the time, and $\beta$ is an empirical coefficient.

2. The multimodal dimensional emotion recognition method according to claim 1, wherein the step of extracting features from the audio, the video and the text respectively comprises:

segmenting the audio to obtain frame-level short-term audio clips, and inputting the short-term audio clips into a pre-trained audio feature extraction network respectively to obtain the frame-level audio feature;

extracting frame-level facial images from the video by using a facial detection tool, and inputting the frame-level facial images into a pre-trained facial expression feature extraction network respectively to obtain the frame-level video feature;

segmenting the text into words by using a word segmentation tool, inputting the text processed by word segmentation into a pre-trained text feature extraction network to obtain a word-level text feature;

acquiring alignment information of each word in the text of the sample to be tested by using a text alignment tool; and converting the word-level text feature into the frame-level text feature according to the alignment information.

3. The multimodal dimensional emotion recognition method according to claim 1, wherein the step of performing temporal contextual modeling on the frame-level audio feature, the frame-level video feature, and the frame-level text feature respectively by using the temporal convolutional network comprises:

inputting the frame-level audio feature into an N-layer temporal convolutional network to obtain the contextual audio feature, where N is set to 1-3;

inputting the frame-level video feature into an N-layer temporal convolutional network to obtain the contextual video feature, where N is set to 1-3; and inputting the frame-level text feature into an N-layer temporal convolutional network to obtain the contextual text feature, where N is set to 1-3.

4. The multimodal dimensional emotion recognition method according to claim 1, wherein $\beta$ is set between 0 and 1.

5. The multimodal dimensional emotion recognition method according to claim 1, wherein the step of performing regression prediction on the contextual spliced feature to obtain the final dimensional emotion prediction result comprises:

inputting the contextual spliced feature into the following fully connected network model for regression prediction:

$$y = \sigma(WS+b),$$

where

σ is a sigmoid activation function;
W is a linear transformation matrix, which is a constant;
b is a bias coefficient, which is a constant; and
y is a prediction result for the dimensional emotion.

6. An electronic device comprising a memory, a processor, and a computer program stored on the memory and executable on the processor, wherein the computer program, when executed by the processor, is configured to implement steps of the method according to claim 1.

* * * * *